(12) United States Patent
Chang

(10) Patent No.: US 12,406,476 B2
(45) Date of Patent: Sep. 2, 2025

(54) IMAGE RECOGNITION EDGE DEVICE AND METHOD

(71) Applicant: INSTITUTE FOR INFORMATION INDUSTRY, Taipei (TW)

(72) Inventor: Jun-Dong Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 424 days.

(21) Appl. No.: 18/058,878

(22) Filed: Nov. 28, 2022

(65) Prior Publication Data

US 2024/0169702 A1 May 23, 2024

(30) Foreign Application Priority Data

Nov. 21, 2022 (TW) .................... 111144484

(51) Int. Cl.
*G06V 10/774* (2022.01)
*G06V 10/82* (2022.01)

(52) U.S. Cl.
CPC ............ *G06V 10/774* (2022.01); *G06V 10/82* (2022.01)

(58) Field of Classification Search
CPC .... G06V 10/774; G06V 10/82; G06V 10/454; G06V 10/764; G06V 10/771; G06N 3/0464; G06N 3/08
USPC ......................................................... 382/100
See application file for complete search history.

(56) References Cited

U.S. PATENT DOCUMENTS

| | | | | |
|---|---|---|---|---|
| 10,621,779 B1 * | 4/2020 | Topiwala | ............ | G06F 18/253 |
| 2017/0154425 A1 * | 6/2017 | Pierce | .................... | G06N 3/084 |
| 2017/0286774 A1 * | 10/2017 | Gaidon | .................... | G06N 3/08 |
| 2020/0089965 A1 * | 3/2020 | Hollander | .............. | G06V 20/41 |
| 2020/0104851 A1 * | 4/2020 | Agarwal | ................ | G06N 3/084 |
| 2024/0046630 A1 * | 2/2024 | Chaurasia | ............ | G06V 10/806 |
| 2024/0135572 A1 * | 4/2024 | Singh | ........................ | G06N 3/09 |

FOREIGN PATENT DOCUMENTS

| CN | 114170526 A | 3/2022 |
|---|---|---|
| CN | 115294394 A | 11/2022 |

OTHER PUBLICATIONS

The office action of the corresponding Taiwanese application No. TW111144484 issued on Jan. 5, 2024.

* cited by examiner

*Primary Examiner* — Ali Bayat
(74) *Attorney, Agent, or Firm* — CKC & Partners Co., LLC

(57) ABSTRACT

An image recognition edge device is provided, which includes a memory and a processor. The processor accesses multiple instructions to perform the following operations: downsampling an input image to generate a downsampled image; inputting the downsampled image into an object recognition model through multiple convolutional layers thereby sequentially generating multiple feature tensors; selecting a part of the feature tensors to form a first feature tensor pyramid; selecting another part of the feature tensors to form a second feature tensor pyramid; inputting the first feature tensor pyramid and the second feature tensor pyramid into a combined fully connected layer, generating a first image detection label by a first fully connected output layer based on the first feature tensor pyramid, and generating a second image detection label by the second fully connected output layer based on the second feature tensor pyramid.

20 Claims, 5 Drawing Sheets

IMAGE RECOGNITION EDGE DEVICE AND METHOD

CROSS-REFERENCE TO RELATED APPLICATION

This application claims priority to Taiwan Application Serial Number 111144484, filed Nov. 21, 2022, which is herein incorporated by reference in its entirety.

BACKGROUND

Field of Invention

The present invention relates to a machine learning technology. More particularly, the present invention relates to a machine learning technology with a function for saving computing resources.

Description of Related Art

As far as a current machine learning technology is concerned, it often requires a lot of time resources and computing resources to complete the training of the model. When it is necessary to complete the training and use of the machine learning model on the edge computing platform, the edge computing platform cannot execute the machine learning model due to insufficient computing resources. Therefore, how to solve the problem that the edge computing platform cannot execute the machine learning model due to insufficient computing resources is a problem that those skilled in the art are eager to solve.

SUMMARY

The invention provides an image recognition edge device, which includes a memory and a processor. The memory is configured for storing a plurality of instructions. The processor is connected to the memory, and configured for executing an object recognition model, wherein the object recognition model includes a plurality of convolutional layers and a combined fully connection layer, the plurality of convolutional layers are sequentially connected in sequence, and the combined fully connection layer includes a first fully connection output layer and a second fully connection output layer, wherein the processor accesses the plurality of instructions to perform following operations: downsampling an input image to generate a downsampled image; inputting the downsampled image into the object recognition model thereby sequentially generating a plurality of feature tensors through the plurality of convolutional layers; selecting a part of the plurality of feature tensors to form a first feature tensor pyramid; selecting another part of the plurality of feature tensors to form a second feature tensor pyramid; and inputting the first feature tensor pyramid and the second feature tensor pyramid into the combined fully connection layer, generating a first image detection label by the first fully connection output layer based on the first feature tensor pyramid, and generating a second image detection label by the second fully connection output layer based on the second feature tensor pyramid.

The invention provides an image recognition edge method for an image recognition edge device, comprising: downsampling an input image to generate a downsampled image; inputting the downsampled image into an object recognition model thereby sequentially generating a plurality of feature tensors through a plurality of convolutional layers, wherein the object recognition model includes the plurality of convolutional layers and a combined fully connection layer, the plurality of convolutional layers are sequentially connected in sequence, and the combined fully connection layer includes a first fully connection output layer and a second fully connection output layer; selecting a part of the plurality of feature tensors to form a first feature tensor pyramid; selecting another part of the plurality of feature tensors to form a second feature tensor pyramid; and inputting the first feature tensor pyramid and the second feature tensor pyramid into the combined fully connection layer, generating a first image detection label by the first fully connection output layer based on the first feature tensor pyramid, and generating a second image detection label by the second fully connection output layer based on the second feature tensor pyramid.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
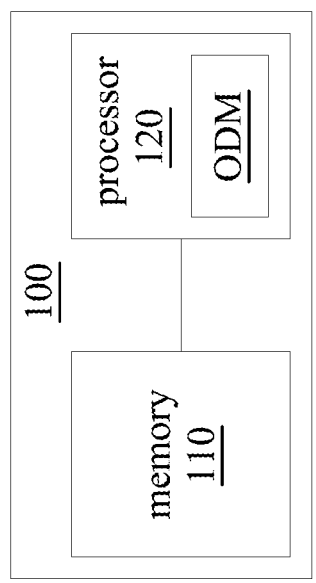
FIG. 1 is a schematic diagram of an image recognition edge device of the present disclosure.

Reference will now be made in detail to the present embodiments of the invention, examples of which are illustrated in the accompanying drawings. Wherever possible, the same reference numbers are used in the drawings and the description to refer to the same or like parts.

For a current machine learning technology, because computing power of an edge computing platform is often relatively low, therefore, a deep neural network model (DNN) is more difficult under the computing power limit of the edge computing platform. Simultaneous execution of more than two computing models (e.g., mask detection, pedestrian detection, face detection, etc.) requirements. In view of this, the present disclosure proposes a structure combining a main backbone for feature extraction and a multi-task fully connection layer to combine multiple models into one model. In this way, the computing resource consumption of the edge computing platform will be greatly reduced, and excellent recognition accuracy can be maintained while saving computing resources.

Referring to FIG. 1, FIG. 1 is a schematic diagram of an image recognition edge device 100 of the present disclosure. As shown in FIG. 1, the image recognition edge device 100 includes a memory 110 and a processor 120. The processor 120 is coupled to the memory 110.

In some embodiments, the image recognition edge device 100 can be implemented by physical or virtual devices with edge computing capabilities, such as an edge computing device or an edge cloud. In some embodiments, the memory 110 can be implemented by a memory unit, flash memory, read-only memory, hard disk, any equivalent storage components, or a combination thereof. In some embodiments, the processor 120 can be implemented by a processing circuit, a central processing unit, a computing unit or a combination thereof.

In some embodiments, the image recognition edge device 100 is not limited to include the memory 110 and the processor 120, the image recognition edge device 100 can further include other elements required for operation and application. For example, the image recognition edge device 100 can further include an output interface (e.g., a display panel for displaying information), an input interface (e.g., a touch panel, a keyboard, a microphone, a scanner or a flash memory reader), and a communication circuit (e.g., a WiFi communication module, a Bluetooth communication module, a wireless telecommunication network communication module, etc.).

In this embodiment, the memory 110 stores multiple instructions, where these instructions can be pre-stored software or firmware instruction programs. The processor 120 accesses the multiple instructions to perform various operations.

As shown in FIG. 1, the processor 120 is used for executing an object recognition model ODM based on corresponding software or firmware instruction programs. In some embodiments, the object recognition model ODM can perform object recognition on input data (for example, pre-stored image data (e.g. a frame) or image data received from the outside (e.g., through photographic devices, including but not limited to video cameras) of the image recognition edge device 100. For example, the object recognition model ODM can detect (e.g., recognize) the input image with a vehicle, a human face, a license plate, a character, a totem or other image feature objects. The object recognition model ODM can generate corresponding labels according to an identification result. Even, the object recognition model ODM can generate a bounding box according to the identification result. It should be noted that the object recognition model ODM can refer to its own object recognition model parameter when processing the object recognition. In some embodiments, the object recognition model parameter can be pre-trained on an edge server (not shown) to be stored in the memory 110, instead of being trained in the image recognition edge device 100 to generate.

In this embodiment, the object recognition model ODM includes multiple convolutional layers and a combined fully connection layer, the multiple convolutional layers are connected in sequence, multiple identification tasks can select a specified quantity of convolutional layers from the multiple convolutional layers according to their identification application features (i.e., features required by the identification tasks), and then the feature tensors generated by these convolutional layers are input into the combined fully connection layer, where the combined fully connection layer includes a first fully connection output layer and a second fully connection output layer (i.e., two identification tasks can be performed). It should be noted that the combined fully connection layer here includes multiple connected fully connection layers in sequence, and this combined fully connection layer can have a multi-task fully connection layer structure, where the feature tensors generated by the above-mentioned convolutional layers can be perform feature pyramid processing (i.e., feature pyramid network (FPN)) to be input to a front-end fully connection layer of these fully connection layers. In addition, although 2 fully connection output layers are taken as an example here, the quantity of fully connection output layers can also be other quantities in response to different quantities of identification tasks. The 2 fully connection output layers here are just an exemplary embodiment.

Figure 2:
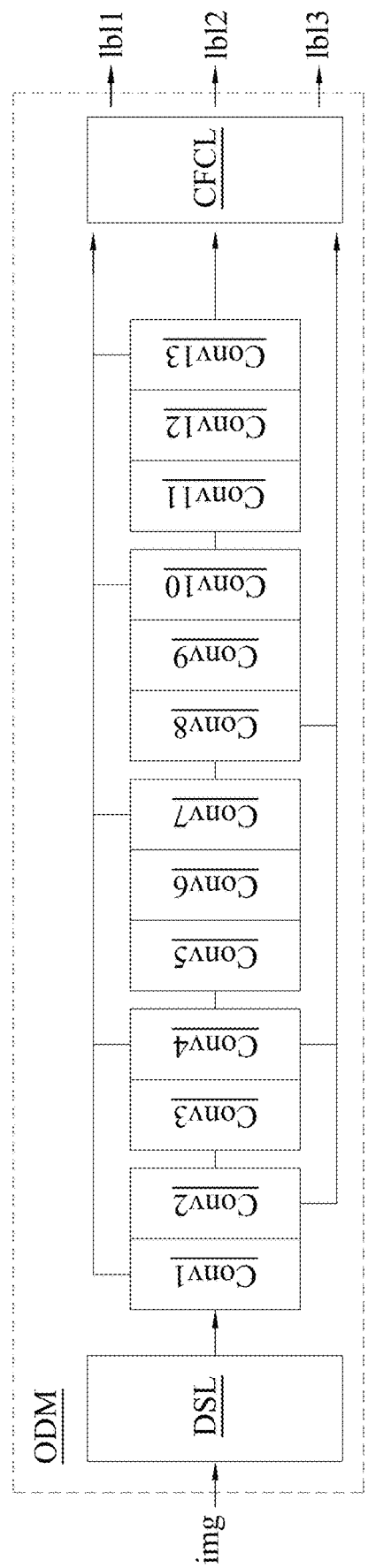
FIG. 2 is a schematic diagram of an object recognition model according to some embodiments of the present disclosure.

The following is a practical example to illustrate the object recognition model ODM processing three recognition tasks. Referring to FIG. 2 together, FIG. 2 is a schematic diagram of the object recognition model ODM according to some embodiments of the present disclosure. As shown in FIG. 2, the object recognition model ODM can include a downsampling layer DSL, multiple convolutional layers Conv1-Conv13 connected in sequence, and the combined fully connected layer CFCL. The input image img can be input to the downsampling layer DSL. The downsampling layer DSL is connected to the convolutional layers Conv1-Conv13. The convolutional layers Conv1-Conv13 will generate their respective feature tensors in sequence.

The 4 feature tensors generated by the convolutional layers Conv1, Conv4, Conv7, Conv10, and Conv13 can be performed feature pyramid processing to be input to the combined fully connected layer CFCL. The feature tensor generated by the convolutional layer Conv13 is also performed feature pyramid processing and input to the combined fully connected layer CFCL. Since only one feature tensor is extracted, this feature tensor can be output directly after being performed feature pyramid processing. The 3 feature tensors generated by the convolutional layers Conv2, Conv4 and Conv8 are also performed feature pyramid processing and input to the combined fully connected layer CFCL. In this way, the combined fully connected layer CFCL can output 3 image detection labels lbl1-lbl3 (e.g., identification results including detected objects and location of the objects) from 3 fully connected output layers.

It should be noted that, although the convolutional layers Conv1-Conv13 and 3 paths for extracting the feature tensors are taken as examples here, in practical applications, the quantity of convolutional layers and the paths for extracting feature tensors can still be adjusted according to requirements of different identification tasks, and there are no special restrictions on the quantity of convolutional layers and the paths for extracting feature tensors. In addition, the above-mentioned feature pyramid processing can be further described with practical examples later.

Figure 3:
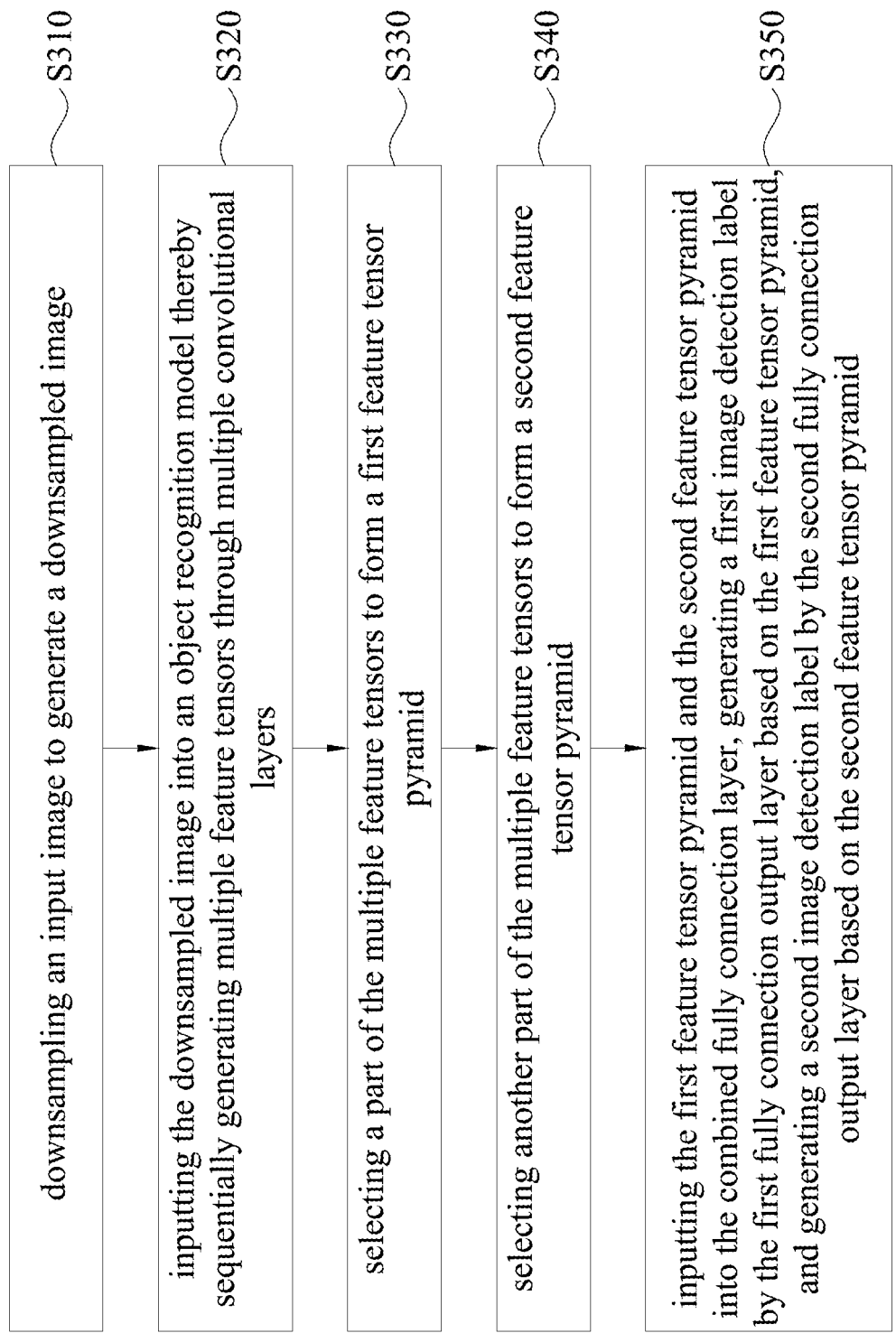
FIG. 3 is a flow chart of an image recognition edge method of the present disclosure.

Referring to FIG. 3. FIG. 3 is a flow chart of an image recognition edge method. The image recognition edge device 100 shown in FIG. 1 can be used to implement the image recognition edge method in FIG. 3.

As shown in FIG. 3, the image recognition edge method includes steps S310-S350. Firstly, in step S310, the input image is downsampled to generate a downsampled image. In other words, before inputting the image into the object recognition model ODM, a size of the image is reduced to a uniform size to match the image input size corresponding to the object recognition model ODM (because the object recognition model ODM can only be input into an image of a specific size).

Furthermore, in step S320, the downsampled image is input into the object recognition model ODM thereby sequentially generating multiple feature tensors through multiple convolutional layers. In other words, after the downsampled image is input to the object recognition model ODM, each convolutional layer can generate a feature tensor. For example, when the object recognition model ODM has 13 convolutional layers, each of these convolutional layers can generate respective feature tensors (i.e., 13 feature tensors). In some embodiments, the feature tensor can include a two-dimensional feature matrix (or termed as a feature map).

Furthermore, in step S330, a part of the multiple feature tensors is selected to form a first feature tensor pyramid. In other words, the feature tensors output by the part of the convolutional layers are converted into the first feature tensor pyramid. In some embodiments, the part of the multiple feature tensors can be selected according to a first recognition task. In other words, these selected feature tensors are generated according to the specific recognition task. In some embodiments, the part of the feature tensors can be selected through multiple experiments of the first identification task. In other words, which part of the multiple feature tensors to select is determined after multiple first identification tasks, and based on these selected feature tensors, and a best image detection label (i.e., the identification result with the highest accuracy) can be generated.

For example, when performing face recognition is desired, through multiple face recognition experiments, based on the feature tensors generated by the 1st, 3th and 5th layers of the multiple convolutional layers connected sequentially, the best image detection labels for the face recognition can be generated.

In some embodiments, the part of the feature tensors can be performed feature pyramid processing to generate the first feature tensor pyramid. In some embodiments, feature pyramid processing can be performed on the part of the multiple feature tensors to generate multiple first pyramid feature tensors, and multiple first loss rates can be calculated according to the multiple first pyramid feature tensors, where the loss rate can use mean squared error (MSE), cross entropy and other methods (and is not limited by the above-mentioned methods) to evaluate the model training effect. In some embodiments, whether any one of the multiple first loss rates generated according to the multiple first pyramid feature tensors is less than (or equal to) a loss rate threshold can be determined. Then, when any one of the multiple first loss rates is less than the loss rate threshold, the multiple first pyramid feature tensors can be stacked into the first feature tensor pyramid. When none of the multiple first loss rates is less than the loss rate threshold, a new part of the multiple feature tensors can be selected for performing feature pyramid processing to generate a new first feature tensor pyramid.

For example, in a training phase, when the feature tensors generated by the 1st, 3th and 5th layers in the multiple convolutional layers are performing feature pyramid processing, multiple loss rates can be generated by loss rate calculations being continuously recursive (i.e., back propagation algorithm) based on the feature tensors generated by the 1st, 3th and 5th layers. Once a loss rate less than the loss rate threshold is found to be calculated after a specific quantity of recursions (e.g., 1000 by default), in an usage phase, the feature tensors generated in the 1st, 3th and 5th layers can be performing feature pyramid processing to generate the first feature tensor pyramid.

In contrary, when discovering all loss rates calculated after a specific quantity of recursions are not less than the loss rate threshold, the feature tensors generated by the 1st and 5th layers can be selected again, so as to perform loss rate calculations for a specific quantity of recursions again. Once that the loss rate generated from these feature tensors is less than the loss rate threshold after the specific quantity of recursions is found, in the usage phase, the feature tensors generated by the 1st and 5th layers can be performing feature pyramid processing to generate a new first feature tensor pyramid.

In some embodiments, the part of the multiple feature tensors can include a first high-level tensor and a first low-level tensor, and a level of the convolutional layer corresponding to the first high-level tensor can be less than a level of the convolutional layer corresponding to the first low-level tensor.

In some embodiments, a deconvolution processing can be performed on the first high-level tensor to generate the first upsampled tensor. Then, a convolution processing can be performed on the first low-level tensor to generate a first convolution tensor. Then, element-wise addition operation can be performed on the first upsampled tensor and the first convolution tensor to generate one of the multiple first pyramid feature tensors. In some embodiments, normalization processing can be further performed on the first low-level tensor to generate the first convolution tensor after the convolution processing.

Furthermore, in step S340, another part is selected from the multiple feature tensors to form a second feature tensor pyramid. In other words, the feature tensor output by the other part of the multiple convolutional layers is converted into the second feature tensor pyramid. In other words, the feature tensor output by the other part of the multiple convolutional layers is converted into the second feature tensor pyramid. In some embodiments, the other part can be selected from the multiple feature tensors according to the second identification task. In other words, the selected feature tensors are generated according to another specific identification task. In some embodiments, the other part can be selected from the multiple feature tensors through multiple experiments of the second recognition task. In other words, which part of the multiple feature tensors to be selected is determined after the multiple second identification tasks, and the best identification label for the second identification task can be generated based on the selected feature tensors.

For example, when performing pedestrian recognition is desired, through multiple face recognition experiments, based on the feature tensors generated by the 2nd, 6th and 7th layers of the multiple convolutional layers connected sequentially, the best image detection labels for the pedestrian recognition can be generated.

In some embodiments, the other part of the feature tensors can be performed feature pyramid processing to generate the first feature tensor pyramid. In some embodiments, feature pyramid processing can be performed on the other part of the multiple feature tensors to generate multiple second pyramid feature tensors, and multiple second loss rates can be calculated according to the multiple second pyramid feature tensors. In some embodiments, whether any one of the multiple second loss rates generated according to the multiple second pyramid feature tensors is less than (or equal to) the loss rate threshold can be determined. Then, when any one of the multiple second loss rates is less than the loss rate threshold, the multiple second pyramid feature tensors can be stacked into the second feature tensor pyramid. When none of the multiple second loss rates is less than the loss rate threshold, a new part of the multiple feature tensors can be selected for performing feature pyramid processing to generate a new second feature tensor pyramid.

For example, in the training phase, when the feature tensors generated by the 2nd, 6th and 7th layers in the multiple convolutional layers are performing feature pyramid processing, multiple loss rates can be generated by loss rate calculations being continuously recursive based on the feature tensors generated by the 2nd, 6th and 7th layers. Once a loss rate less than the loss rate threshold is found to be calculated after a specific quantity of recursions, in the usage phase, the feature tensors generated in the 2nd, 6th and 7th layers can be performing feature pyramid processing to generate the second feature tensor pyramid.

In contrary, when discovering all loss rates calculated after a specific quantity of recursions are not less than the loss rate threshold, the feature tensors generated by the 1st and 6th layers can be selected again, so as to perform loss rate calculations for a specific quantity of recursions again. Once that the loss rate generated from these feature tensors is less than the loss rate threshold after the specific quantity of recursions is found, in the usage phase, the feature tensors generated by the 1st and 6th layers can be performing feature pyramid processing to generate a new second feature tensor pyramid.

In some embodiments, the other part of the multiple feature tensors can include a second high-level tensor and a second low-level tensor, and a level of the convolutional layer corresponding to the second high-level tensor can be less than a level of the convolutional layer corresponding to the second low-level tensor.

In some embodiments, a deconvolution processing can be performed on the second high-level tensor to generate the second upsampled tensor. Then, a convolution processing can be performed on the second low-level tensor to generate a second convolution tensor. Then, element-wise addition operation can be performed on the second upsampled tensor and the second convolution tensor to generate one of the multiple second pyramid feature tensors. In some embodiments, normalization processing can be further performed on the second low-level tensor to generate the second convolution tensor after the convolution processing.

In other words, the method of generating the multiple second pyramid feature tensors is similar to the method of generating the multiple first pyramid feature tensors, the difference is that the two can be generated according to different feature tensor groups. For example, the multiple second pyramid feature tensors can be generated according to the feature tensors generated by the 2nd, 6th and 7th layers in the multiple convolutional layers, and the multiple first pyramid feature tensors can be generated according to the feature tensors generated by the 1st, 3th and 5th layers in the multiple convolutional layers.

Figure 4:
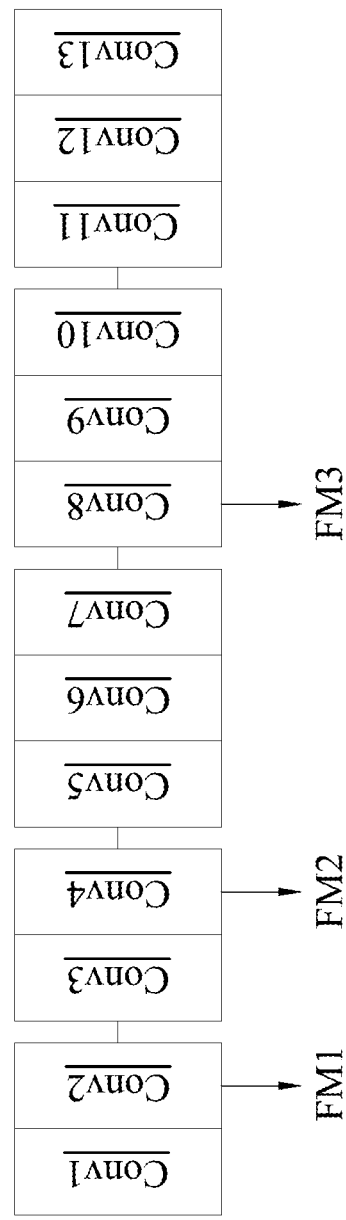
FIG. 4 is a schematic diagram of selecting feature tensors according to some embodiments of the present disclosure.
Figure 5:
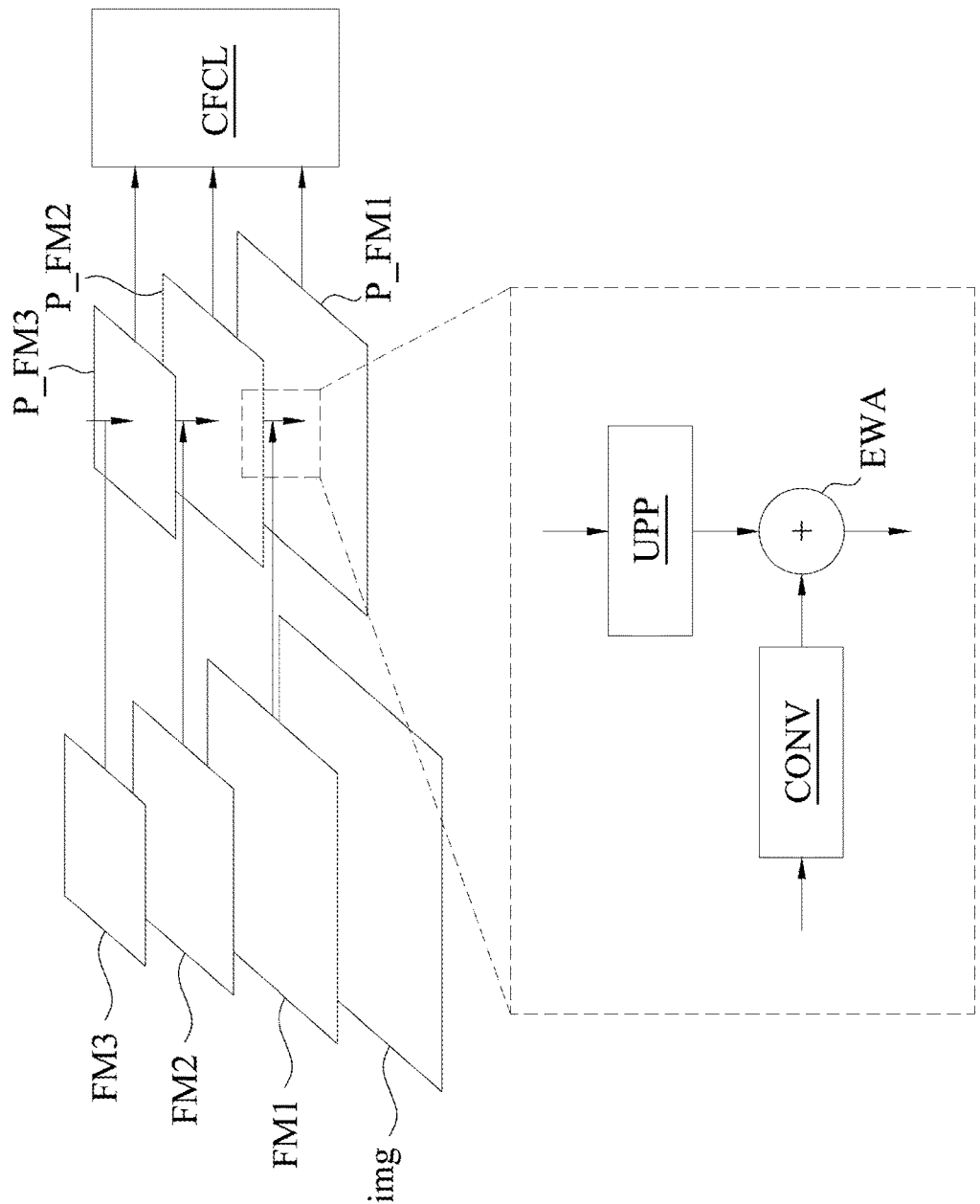
FIG. 5 is a schematic diagram of feature pyramid processing according to some embodiments of the present disclosure.

How these pyramid feature tensors (i.e., the above-mentioned first pyramid feature tensor and the second pyramid feature tensor) being generated are illustrated as practical examples below. Referring to FIG. 4 and FIG. 5 together, FIG. 4 is a schematic diagram of selected feature tensors FM1-FM3 according to some embodiments of the disclosure, and FIG. 5 is a schematic diagram of feature pyramid processing according to some embodiments of the present disclosure. As shown in FIG. 4 and FIG. 5, for one of the recognition tasks of the object recognition model ODM in FIG. 2, based on the input image img, the feature tensors FM1-FM3 can be extracted from the convolutional layers Conv2, Conv4, and Conv8 in the object recognition model ODM in FIG. 2. When performing feature pyramid processing on the extracted feature tensors FM1-FM3, the feature tensor generated by the convolutional layer Conv8 can be performed deconvolution processing UPP to generate an upsampled tensor, and the feature tensor generated by the convolutional layer Conv4 can be performed convolution processing (e.g., a convolution kernel with a size of 1×1 is convolved) CONV and normalized to generate a convolution tensor. The upsampling here can expand the size of the feature tensor generated by the convolutional layer Conv8 to the same size as this convolution tensor. Then, the upsampling tensor and the convolution tensor can be performed element-by-element addition operation EWA to generate a pyramid feature tensor P_FM2.

Then, the pyramid feature tensor P_FM2 can be performed deconvolution processing UPP to generate another upsampled tensor, and the feature tensor generated by the convolutional layer Conv2 can be performed convolution processing CONV and normalized to generate another convolution tensor. The upsampling here can also expand the size of the feature tensor generated by the convolutional layer Conv2 to be the same size as the other convolutional tensor. Then, the other upsampling tensor and the other convolution tensor can be performed the element-by-element addition operation EWA to generate a pyramid feature tensor P_FM1. That is to say, through the high-level to low-level method, the high-level feature tensor is upsampled and then added to the low-level feature tensor, i.e., the feature tensor FM1-FM3 is made into strong correlation features to obtain the pyramid feature tensor P_FM1.

Finally, the feature tensor generated by the convolutional layer Conv8 can be used as the pyramid feature tensor P_FM3. Assuming that the loss rate generated by the pyramid feature tensors P_FM3, P_FM2, and P_FM1 can be more than the loss rate threshold, the pyramid feature tensors P_FM3, P_FM2, and P_FM1 can be stacked from top to bottom to form a feature tensor pyramid, thereby inputting this feature tensor pyramid into the combined fully connected layer CFCL to perform this identification task.

Furthermore, in step S350, the first feature tensor pyramid and the second feature tensor pyramid are input into the combined fully connection layer, a first image detection label is generated by the first fully connection output layer based on the first feature tensor pyramid, and a second image detection label is generated by the second fully connection output layer based on the second feature tensor pyramid. In some embodiments, the first image detection label and the second image detection label respectively correspond to different identification tasks.

In some embodiments, the combined fully connected layer can convert the first feature tensor pyramid and the second feature tensor pyramid into an augmentation vector (i.e., stretch and concatenate multiple feature tensors), and the first image detection label and the second image detection label can be generated respectively through the first fully connected output layer and the second fully connected output layer according to the augmentation vector. In other words, the multi-task combined fully-connected layers can be directly based on these feature tensor pyramids for performing multi-task identification.

It should be noted that although the above-mentioned image recognition edge method takes 2 identification tasks as an example, in practical applications, it can be expanded to other quantity of identification tasks (e.g., more than 2). For the other quantity of identification tasks, the difference is only that more groups are selected from multiple feature tensors to generate more feature tensor pyramids and more image detection labels.

Through the above steps, the disclosure can combine the main backbone layers (or feature extraction layers) of multiple identification tasks, and use the multi-task fully connected layers to directly generate multiple prediction results.

In this way, the computing resources of the entire image recognition edge device can be greatly saved.

On the application level, the image recognition edge device and method of the disclosure can be used in various fields with machine vision, image classification or data classification. For example, this image recognition edge method can be used in object classification and object localization in medical images (e.g., X-ray images that can distinguish between normal, pneumonia, bronchitis, and heart disease, or ultrasound images that can distinguish normal fetuses from abnormal fetal positions). On the other hand, this image recognition edge method can also be used in the classification of images collected by autonomous driving, such as distinguishing normal roads, roads with obstacles, and road conditions of other vehicles. There are other similar machine learning fields. For example, the image recognition edge device and method disclosed in the disclosure can also be used in other fields related to machine learning such as sound spectrum recognition, spectrum recognition, big data analysis, and data feature recognition.

In summary, the image recognition edge device and method in the disclosure can adopt the single main backbone layer for the multiple different identification tasks, and different identification tasks can extract the required feature tensors from the main backbone layer to form their respective feature tensor pyramids. In this way, these feature tensor pyramids can be directly fed into the large multi-task fully connected layer for the multiple identification tasks. In this way, these identification tasks can share the same model parameter, and it is no longer necessary to design different model architectures for different identification tasks. This can solve the problem that the edge computing platform cannot execute machine learning models due to insufficient computing resources.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image recognition edge device, comprising:
   a memory, configured for storing a plurality of instructions; and
   a processor, connected to the memory, and configured for executing an object recognition model, wherein the object recognition model comprises a plurality of convolutional layers and a combined fully connection layer, the plurality of convolutional layers are sequentially connected in sequence, and the combined fully connection layer comprises a first fully connection output layer and a second fully connection output layer, wherein the processor accesses the plurality of instructions to perform following operations:
   downsampling an input image to generate a downsampled image;
   inputting the downsampled image into the object recognition model thereby sequentially generating a plurality of feature tensors through the plurality of convolutional layers;
   selecting a part of the plurality of feature tensors to form a first feature tensor pyramid;
   selecting another part of the plurality of feature tensors to form a second feature tensor pyramid; and
   inputting the first feature tensor pyramid and the second feature tensor pyramid into the combined fully connection layer, generating a first image detection label by the first fully connection output layer based on the first feature tensor pyramid, and generating a second image detection label by the second fully connection output layer based on the second feature tensor pyramid, wherein the first image detection label and the second image detection label respectively include an object identification result corresponding to the input image.

2. The image recognition edge device of claim 1, wherein the processor is further configured for:
   performing feature pyramid processing on the part of the plurality of feature tensors to generate the first feature tensor pyramid; and
   performing feature pyramid processing on the other part of the plurality of feature tensors to generate the second feature tensor pyramid.

3. The image recognition edge device of claim 1, wherein the processor is further configured for:
   performing feature pyramid processing on the part of the plurality of feature tensors to generate a plurality of first pyramid feature tensors, and generating the first feature tensor pyramid from the plurality of first pyramid feature tensors according to a plurality of first loss rates generated by the plurality of first pyramid feature tensors; and
   performing feature pyramid processing on the other part of the feature tensors to generate a plurality of second pyramid feature tensors, and generating the second feature tensor pyramid from the plurality of second pyramid feature tensors according to a plurality of second loss rates generated by the plurality of second pyramid feature tensors.

4. The image recognition edge device of claim 3, wherein the part of the plurality of feature tensors comprises a first high-level tensor and a first low-level tensor, an level of a convolutional layer corresponding to the first high-level tensor is less than an level of a convolutional layer corresponding to the first low-level tensor, wherein the processor is further configured for:
   performing deconvolution processing on the first high-level tensor to generate a first upsampled tensor;
   performing convolution processing on the first low-level tensor to generate a first convolution tensor; and
   generating one of the plurality of first pyramid feature tensors according to the first upsampled tensor and the first convolution tensor.

5. The image recognition edge device of claim 4, wherein the processor is further configured for:
   performing element-wise addition operation on the first upsampled tensor and the first convolution tensor to generate the one of the plurality of first pyramid feature tensors.

6. The image recognition edge device of claim 3, wherein the other part of the plurality of feature tensors comprises a second high-level tensor and a second low-level tensor, a level of a convolutional layer corresponding to the second high-level tensor is less than an level of a convolutional layer corresponding to the second low-level tensor, wherein the processor is further configured for:
   performing deconvolution processing on the second high-level tensor to generate a second upsampled tensor;

performing convolution processing on the second low-level tensor to generate a second convolution tensor; and generating the one of the plurality of second pyramid feature tensors according to the second upsampled tensor and the second convolution tensor.

7. The image recognition edge device of claim 6, wherein the processor is further configured for:

performing element-wise addition operation on the second upsampled tensor and the second convolution tensor to generate the one of the plurality of second pyramid feature tensors.

8. The image recognition edge device of claim 1, wherein the processor is further configured for:

selecting the part of the plurality of feature tensors through experiments of a first identification task.

9. The image recognition edge device of claim 8, wherein the processor is further configured for:

selecting the other part of the plurality of feature tensors through experiments of a second identification task, wherein the second identification task is different from the first identification task.

10. The image recognition edge device of claim 1, wherein the first image detection label and the second image detection label respectively correspond to different identification tasks.

11. An image recognition edge method for an image recognition edge device, comprising:

downsampling an input image to generate a downsampled image;

inputting the downsampled image into an object recognition model thereby sequentially generating a plurality of feature tensors through a plurality of convolutional layers, wherein the object recognition model comprises the plurality of convolutional layers and a combined fully connection layer, the plurality of convolutional layers are sequentially connected in sequence, and the combined fully connection layer comprises a first fully connection output layer and a second fully connection output layer;

selecting a part of the plurality of feature tensors to form a first feature tensor pyramid;

selecting another part of the plurality of feature tensors to form a second feature tensor pyramid; and inputting the first feature tensor pyramid and the second feature tensor pyramid into the combined fully connection layer, generating a first image detection label by the first fully connection output layer based on the first feature tensor pyramid, and generating a second image detection label by the second fully connection output layer based on the second feature tensor pyramid, wherein the first image detection label and the second image detection label respectively include an object identification result corresponding to the input image.

12. The image recognition edge method of claim 11, wherein the step of selecting the part of the plurality of feature tensors to form the first feature tensor pyramid comprises:

performing feature pyramid processing on the part of the plurality of feature tensors to generate the first feature tensor pyramid; and performing feature pyramid processing on the other part of the plurality of feature tensors to generate the second feature tensor pyramid.

13. The image recognition edge method of claim 11, wherein the step of selecting the part of the plurality of feature tensors to form the first feature tensor pyramid comprises:

performing feature pyramid processing on the part of the plurality of feature tensors to generate a plurality of first pyramid feature tensors, and generating the first feature tensor pyramid from the plurality of first pyramid feature tensors according to a plurality of first loss rates generated by the plurality of first pyramid feature tensors; and performing feature pyramid processing on the other part of the feature tensors to generate a plurality of second pyramid feature tensors, and generating the second feature tensor pyramid from the plurality of second pyramid feature tensors according to a plurality of second loss rates generated by the plurality of second pyramid feature tensors.

14. The image recognition edge method of claim 13, wherein the part of the plurality of feature tensors comprises a first high-level tensor and a first low-level tensor, an level of a convolutional layer corresponding to the first high-level tensor is less than an level of a convolutional layer corresponding to the first low-level tensor, wherein the step of performing the feature pyramid processing on the part of the plurality of feature tensors to generate the plurality of first pyramid feature tensors comprises:

performing deconvolution processing on the first high-level tensor to generate a first upsampled tensor;

performing convolution processing on the first low-level tensor to generate a first convolution tensor; and generating one of the plurality of first pyramid feature tensors according to the first upsampled tensor and the first convolution tensor.

15. The image recognition edge method of claim 14, wherein the step of generating the one of the plurality of first pyramid feature tensors according to the first upsampled tensor and the first convolution tensor comprises:

performing element-wise addition operation on the first upsampled tensor and the first convolution tensor to generate the one of the plurality of first pyramid feature tensors.

16. The image recognition edge method of claim 13, wherein the other part of the plurality of feature tensors comprises a second high-level tensor and a second low-level tensor, a level of a convolutional layer corresponding to the second high-level tensor is less than an level of a convolutional layer corresponding to the second low-level tensor, wherein the step of performing the feature pyramid processing on the other part of the feature tensors to generate the plurality of second pyramid feature tensors comprises:

performing deconvolution processing on the second high-level tensor to generate a second upsampled tensor;

performing convolution processing on the second low-level tensor to generate a second convolution tensor; and generating the one of the plurality of second pyramid feature tensors according to the second upsampled tensor and the second convolution tensor.

17. The image recognition edge method of claim 16, wherein the step of generating the one of the plurality of second pyramid feature tensors according to the second upsampled tensor and the second convolution tensor comprises:

performing element-wise addition operation on the second upsampled tensor and the second convolution tensor to generate the one of the plurality of second pyramid feature tensors.

18. The image recognition edge method of claim 11, further comprising:
    selecting the part of the plurality of feature tensors through experiments of a first identification task.

19. The image recognition edge method of claim 18, further comprising:
    selecting the other part of the plurality of feature tensors through experiments of a second identification task, wherein the second identification task is different from the first identification task.

20. The image recognition edge method of claim 11, wherein the first image detection label and the second image detection label respectively correspond to different identification tasks.

* * * * *